United States Patent
Chen et al.

Patent Number: 6,041,346
Date of Patent: Mar. 21, 2000

[54] METHOD AND SYSTEM FOR PROVIDING REMOTE STORAGE FOR AN INTERNET APPLIANCE

[75] Inventors: Ben W. Chen; Bo Xiong, both of Fremont, Calif.

[73] Assignee: Ateon Networks, Inc., Fremont, Calif.

[21] Appl. No.: 08/953,029

[22] Filed: Oct. 17, 1997

[51] Int. Cl.⁷ ................................................ G06F 13/00
[52] U.S. Cl. ........................................................ 709/218
[58] Field of Search ...................... 395/200.47, 200.48, 395/200.49; 709/217, 218, 219; 711/147

[56] References Cited

U.S. PATENT DOCUMENTS

| | | | |
|---|---|---|---|
| 5,754,771 | 5/1998 | Epperson et al. | 709/203 |
| 5,802,299 | 9/1998 | Logan et al. | 709/218 |
| 5,826,242 | 10/1998 | Montulli | 705/27 |
| 5,832,505 | 11/1998 | Kasso et al. | 707/104 |
| 5,889,949 | 3/1999 | Charles | 709/214 |

*Primary Examiner*—Kenneth Coulter
*Attorney, Agent, or Firm*—Sawyer Law Group LLP

[57] ABSTRACT

The present invention provides a method and system for providing access to a remote network. In a preferred embodiment, a system and method in accordance with the present invention allows a local host on the private network to transparently access the remote network and permit multiple users in the local network to simultaneously access the remote network. This access is based upon the requirements of an application utilizing a mass storage device within the private network. This system allows for user security on the private network.

In one aspect, the method and system allow a private network to access a remote network. The private network has a plurality of components. At least one the plurality of components has a mass storage device. In this aspect, the method and system comprise providing an internet appliance and providing a portion of the mass storage device of the at least one of the plurality of components. The portion of the mass storage device is shareable with and mapped to the internet appliance. In a second aspect, the method and system comprise providing an internet appliance and providing a first component having a mass storage device. A portion of the mass storage device is shareable with and mapped to the internet appliance.

According to the system and method disclosed herein, the present invention provides an internet appliance having remote storage.

40 Claims, 4 Drawing Sheets

METHOD AND SYSTEM FOR PROVIDING REMOTE STORAGE FOR AN INTERNET APPLIANCE

FIELD OF THE INVENTION

The present invention relates to internet appliances and more particularly to a method and system for providing an internet appliance having remote storage.

BACKGROUND OF THE INVENTION

Currently many users are interested in communicating with remote systems. An internet appliance is a device that helps provide access to the remote system, such as a remote network. For example, an internet appliance can aid in gaining access to such a remote network including but not limited to an online service such as COMPUSERVE, AMERICA ONLINE, an internet service provider, or a subset of any of these services.

Conventional internet appliances typically have limited functionality. For example, a conventional router only has sufficient memory to perform the required connection and routing functions. Such conventional internet appliances cannot provide built-in applications and perform such functions as electronic mail to users in the network because these functions require large storage devices.

Some conventional internet appliances have sufficient additional internal memory to provide additional functions. Such conventional internet appliances are known as intelligent internet appliances. Conventional intelligent internet appliances have many levels of functionality. However, these internet appliances are typically complete personal computer systems. Conventional intelligent network appliances having only minimal internal memory provide some additional functions. Other conventional intelligent internet appliances, such as those having an internal hard drive, have added storage and, therefore, added functionality. In order to take advantage of the applications relating to the internet, it may be desirable to use intelligent internet appliance to provide the application to the network users. In order to do so, the internal memory of the conventional intelligent internet appliance is used.

For example, routers may be used to couple workstations of a network to the internet. Some conventional intelligent routers have sufficient internal storage to provide applications. Such conventional intelligent routers can store an operating system and other controlling software, as well as applications such as electronic mail.

Applications such as electronic mail may require a large amount of memory. The actual quantity of memory required for electronic mail varies depending on several factors, including the number of users on a network. Typically, the amount of space required can vary from several megabytes to well over one hundred megabytes. A typical intelligent internet appliance should have at least approximately one hundred megabytes of storage. In order to reduce costs, this internal storage is typically an internal hard drive.

Although conventional intelligent internet appliances having an internal hard drive are capable of providing applications such as electronic mail, use of a hard drive creates other difficulties. For example, a hard drive in the conventional internet appliance adversely affects the reliability of the conventional internet appliance. If, for example, the hard drive fails, it may be difficult to remove the hard drive from the conventional internet appliance. In addition, a back up utility is required when utilizing a hard drive to ensure reliability. This back up utility adds additional cost and complexity to the system. The hard drive also may not limit which users can obtain access to the hard drive. As a result, the security of the hard drive and any application residing on the hard drive may be compromised. Accordingly, while all these features are achievable they can prohibitively add to the cost and complexity of the appliance.

Accordingly, what is needed is a system and method for providing an internet appliance which can be used to provide storage for applications or other uses. The present invention addresses such a need.

SUMMARY OF THE INVENTION

The present invention provides a method and system for providing access to a remote network. In a preferred embodiment, a system and method in accordance with the present invention allows a local host on the private network to transparently access the remote network and permit multiple users in the local network to simultaneously access the remote network. This access is based upon the requirements of an application utilizing a mass storage device within the private network. This system allows for user security on the private network.

In one aspect, the method and system allow a private network to access a remote network. The private network has a plurality of components. At least one the plurality of components has a mass storage device. In this aspect, the method and system comprise providing an internet appliance and providing a portion of the mass storage device of the at least one of the plurality of components. The portion of the mass storage device is shareable with and mapped to the internet appliance. In a second aspect, the method and system comprise providing an internet appliance and providing a first component having a mass storage device. A portion of the mass storage device is shareable with and mapped to the internet appliance.

According to the system and method disclosed herein, the present invention provides an internet appliance having remote storage.

DETAILED DESCRIPTION OF THE INVENTION

Figure 1:
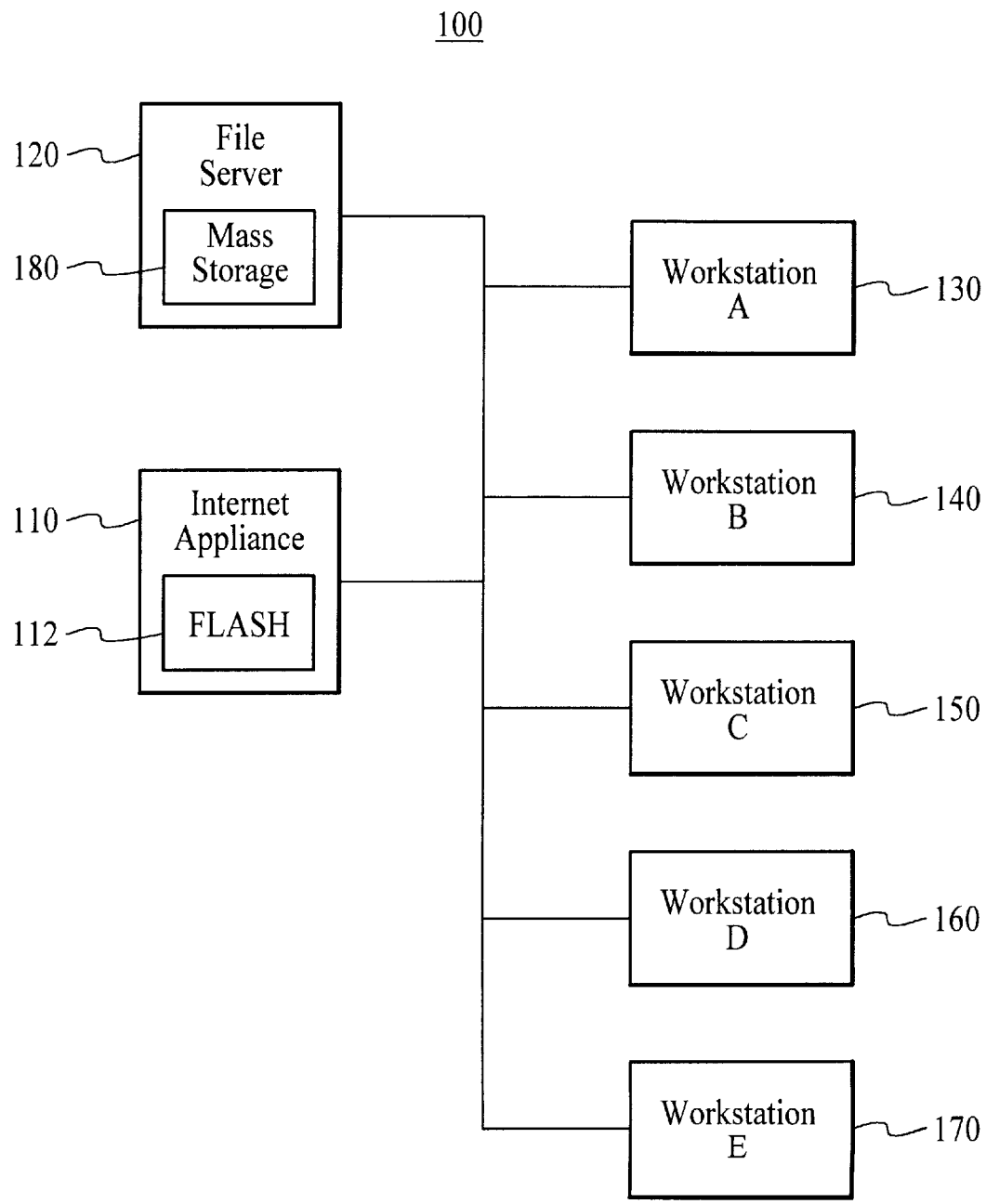
FIG. 1 is a block diagram of one embodiment of a network including an internet-appliance having remote storage in accordance with the method and system.

The present invention relates to an improvement in internet appliances. As used herein, an internet appliance is a device which aids in providing access to a remote system, such as a remote network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Conventional internet appliances, such as routers, typically have only sufficient memory to provide the required functions, such as connection to the remote system and routing between components of the network. Other intelligent internet appliances have enough additional memory to provide additional functions. As used herein, an internal mass storage is the additional memory available in intelligent internet appliances. When sufficient internal mass storage is provided for conventional intelligent internet appliances, such internet appliances can provide applications, such as electronic mail ("email").

Most conventional internet appliances have no internal mass storage for two reasons. First, the amount of internal mass storage required for applications such as email is indeterminate. For example, the amount of memory required for email may vary based on the number of users. Instead of determining the requisite amount of internal mass storage, most manufacturers simply provide no internal mass storage. The second reason why most conventional internet appliances have no internal mass storage is that internal mass storage is very costly. Hard drives are commercially available typically in a minimum size. Oftentimes this minimum size is much greater than the amount of storage required for the application. In addition, the cost of hard drives is high. For applications requiring less memory, other types of memory, such as FLASH memory, can be utilized. However, the cost of FLASH memory is high. As a result, for many applications the cost of FLASH memory is prohibitive. Thus, most conventional internet appliances have no internal mass storage. Consequently, one of ordinary skill in the art will recognize that most conventional internet appliances have limited functionality due to the limited amount of internal mass storage.

Conventional intelligent internet appliances having mass storage, such as a hard drive, for example, approximately one hundred MB, may be capable of providing additional features. Although conventional intelligent internet appliances having an internal hard drive are capable of providing applications such as electronic mail, use of a hard drive creates other difficulties. For example, a hard drive in the conventional internet appliance adversely affects the reliability of the conventional internet appliance. If, for example, the hard drive fails, it may be difficult to remove the hard drive from the conventional internet appliance. This back up utility adds additional cost and complexity to the system. The hard drive also may not limit which users can obtain access to the hard drive. As a result, the security of the hard drive and any application residing on the hard drive may be compromised. Accordingly, while all these features are achievable they can prohibitively add to the cost and complexity of the internet appliance.

The present invention provides for a method and system for providing an internet appliance having internal mass storage that can be used to provide applications. The method and system allocate a portion of the internal mass storage in another system on the network, such as a workstation, and map the mass storage in the other system on the network to the internet appliance. Thus, the method and system include allowing the internet appliance to share the mass storage with the other component. The present invention will be described in terms of a router having mass storage used to run an application such as email. However, one of ordinary skill in the art will readily recognize that this method and system will operate effectively for other types of internet appliances and other applications.

To more particularly illustrate the method and system in accordance with the present invention, refer now to FIG. 1 depicting a block diagram of one embodiment of a network 10 employing such a system. The network 10 includes a file server 120, workstation A 130 through workstation E 170, and an internet appliance 110 in accordance with the method and system. In a preferred embodiment, the internet appliance 110 is used to provide email to the workstation A 130 through workstation E 170. However, nothing prevents the method and system from providing a different application. In addition, although the network 10 is depicted as including only five workstations, nothing prevents the method and system from being used on a network having another number of workstations.

In one embodiment, the internet appliance 110 includes a memory 112 having limited storage capability. In a preferred embodiment, the memory 112 is a FLASH memory with limited storage capacity. Also in a preferred embodiment, the memory 112 is capable of storing an operating system and other controlling software. In one embodiment, the operating system and other controlling software are completely storable in the memory 112. However, in another embodiment, the operating system and other controlling software are stored in a mass storage device 180, discussed below. In such a case, the memory 112 includes the software required to boot up the internet appliance 110 and use the software on the mass storage device 180. Because the memory 112 includes only limited storage capacity, the memory 112 is inexpensive.

A portion of the mass storage device 180 of the file server 120 is allocated for use in providing an application. Thus, the mass storage device of the file server 120 is the memory for the internet appliance 110. Although the mass storage device 180 is shown as being located in the file server 120, the mass storage device 180 can be in any component having sufficient memory including workstation A 130 through workstation E 170 and the file server 120. In one embodiment, the mass storage device 180 stores an application to be provided to the network 100 by the internet appliance 110 but does not store the operating system. In another embodiment, the mass storage device 180 includes the operating system and controlling software in addition to the application.

The mass storage device 180 is shareable and mapped to the internet appliance 110. As a result, the internet appliance 110 can use the mass storage device 180. In a preferred embodiment, the application is electronic mail and the mass storage device 180 is a folder. Note that nothing prevents the method and system from allocating the mass storage device 180 in another component including the file server 120 or another workstation.

Figure 2:
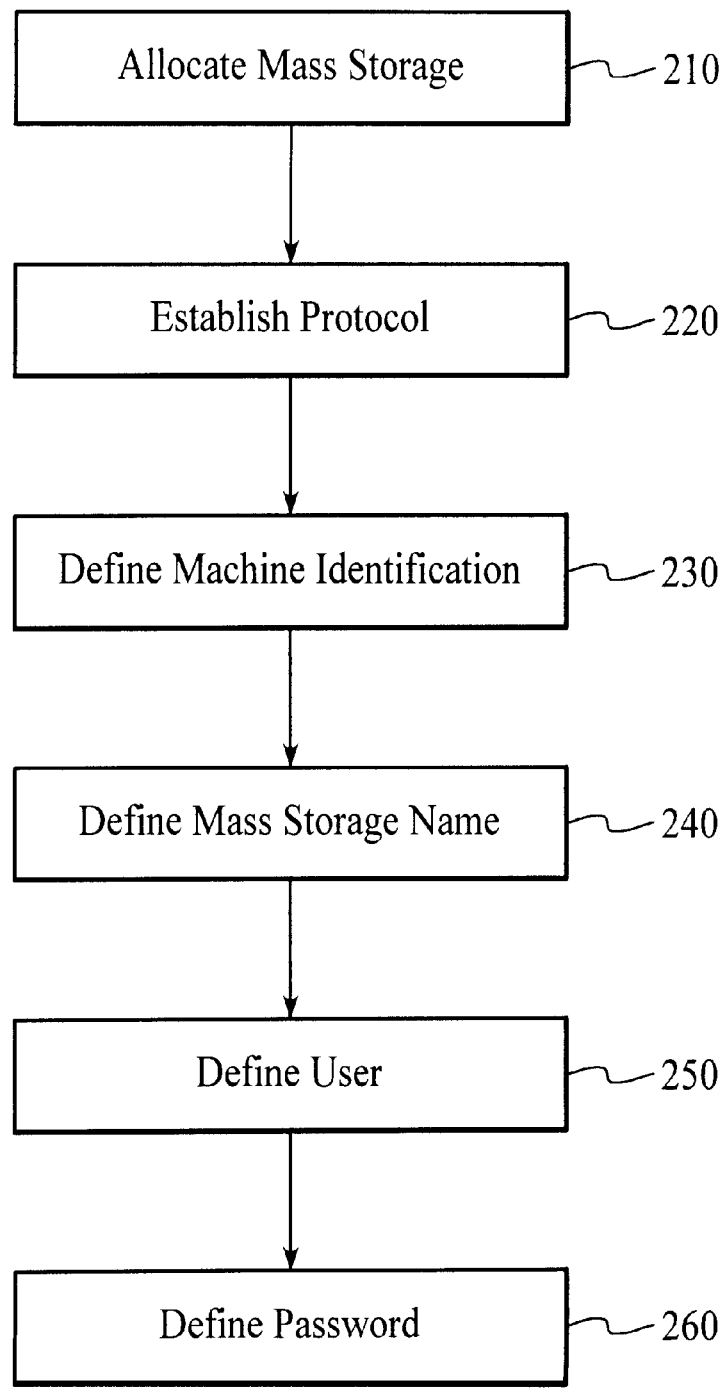
FIG. 2 is a is a flow chart depicting a method for providing remote storage for an internet appliance in accordance with the method and system.

FIG. 2 depicts a flow chart of one method 200 for establishing a link between the mass storage device 180 and the internet appliance 110. The memory is allocated in the remote location, such as file server 120 via step 210. The protocol to be used is then established in step 210. The protocol establishes the manner in which another component, such as the internet appliance 110, can communicate with the mass storage device 180. The machine on which the mass storage device 180 resides is then identified in step 230. This allows the internet appliance 110 to query the appropriate component, file server 120, to access the mass storage device 180. In the network 10 depicted in FIG.

1, the machine identified in step 230 is file server 120. The mass storage device 180 is then given a name in step 240. In a preferred embodiment, the mass storage device 180 is a folder named virtual mailbox.

The users of the mass storage device 180 are then defined in step 250. For example, the internet appliance 110 is defined as a user in the step 250. The password required to access the mass storage device 180 is then provided via step 260. The application residing in the mass storage device 180 is secure because only identified users can access the mass storage device 180 and a password is required to be provided by the internet appliance 110 in order access the mass storage device 180. Once the protocols have been established, the folder named, and the user and password provided, the mass storage device 180 is shareable.

Figure 3:
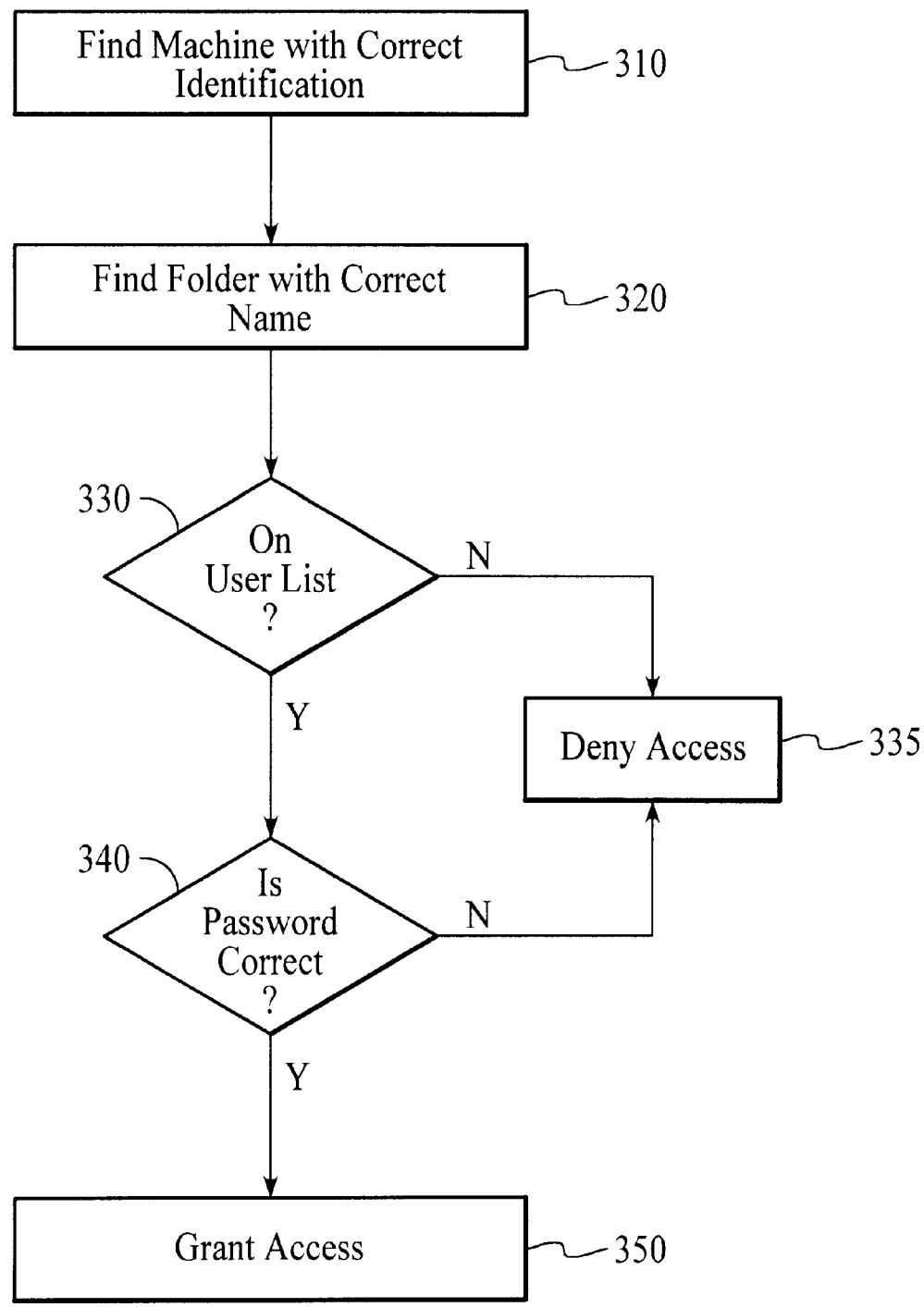
FIG. 3 is a is a flow chart depicting a method for accessing the remote storage for an internet appliance in accordance with the method and system.

FIG. 3 depicts a method 300 for accessing the mass storage device 180. When the internet appliance 110, or another component of the network 100, attempts to access the mass storage device 180, then via step 310 the internet appliance 110 will search for the component with the proper identity as defined in step 230. In step 320 the internet appliance 110 then finds the appropriate folder in the component using the name of the mass storage device 180 provided in step 240. It is determined via step 330 that the internet appliance 110 is a named user. If another component which is not a named user attempts to access the mass storage device 180, then the component will be denied access via step 335. If the internet appliance is a named component, then it must be determined if the password is correct, via step 340. If the correct password is not provided, access to the mass storage device 180 is denied. If the password is correct, authorized users can then access the mass storage device 180.

Using the mass storage device 180, the internet appliance 110 can provide applications to workstation A 130 through workstation E 170. In a preferred embodiment, the mass storage device 180 and the internet appliance 110 provide email capability to the workstation A 130 through the workstation E 170. In one embodiment, the capacity of the mass storage device 180 can be any memory available on the file server 120.

Because the internet appliance 110 does not require a substantial amount of internal memory, the internet appliance 110 can be provided at a much lower cost than a conventional intelligent internet appliance. Because the mass storage device 180 used by the internet appliance 110 is not physically located on the internet appliance 110, the mass storage device 180 can be more easily removed for servicing, thereby improving reliability. Because the method 200 provides a list of users and passwords which are based on the network security infrastructure, the mass storage device 180 is also more secure than the internal memory for a conventional internet appliance.

Figure 4:
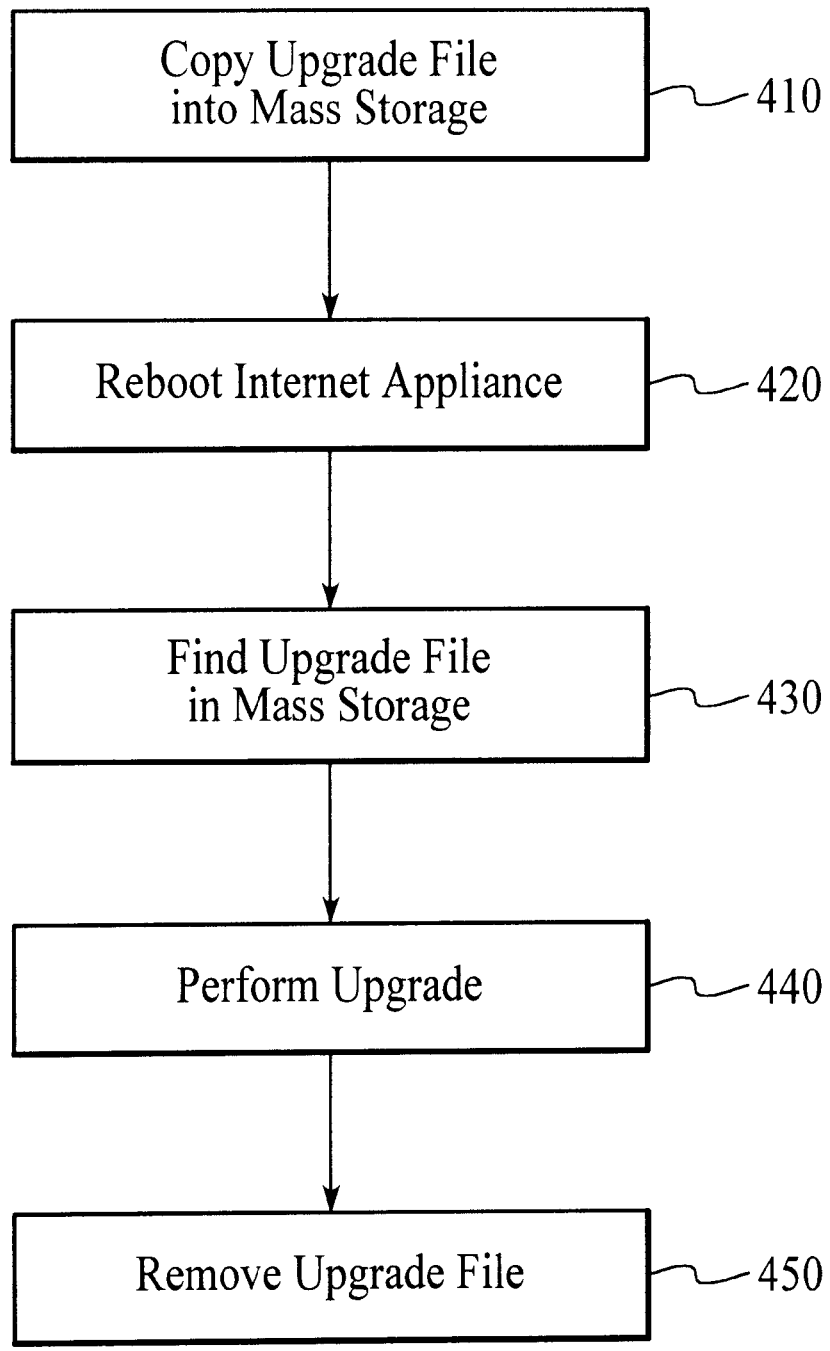
FIG. 4 is a flow chart depicting a method for upgrading the internet appliance in accordance with the method and system.

In one embodiment, the internet appliance 110 is easily upgradable. The internet appliance 110 can be provided with a mechanism for recognizing an upgrade file. Refer now to FIG. 4 depicting one embodiment of a method 400 for upgrading the internet appliance 110. An upgrade file is placed in a recognizable location, such as the mass storage device 180, via step 410. In one embodiment, the placement of the upgrade file in the mass storage device 180 can be accomplished by visiting a website, downloading the upgrade file, and moving the upgrade file into the removable memory. The internet appliance 110 is then rebooted via step 420. Upon rebooting, the internet appliance 110 finds the upgrade file, performs the upgrade, and removes the upgrade file, via steps 430, 440, and 450, respectively. In one embodiment, the installation step 440 includes decrypting the file as well as performing the upgrade. Thus, in addition to providing applications such as email to the workstation A 130 through the workstation E 170, the internet appliance 110 is also easily upgradable.

A method and system has been disclosed for providing a mass storage device for an internet appliance which may allow the internet appliance to provide applications. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing access to a remote network comprising:

an internet appliance; and a first component coupled with the internet appliance and having a mass storage device, a portion of the mass storage device being sharable with and mapped to the internet appliance;

wherein the internet appliance is capable of using any component that is coupled with the internet appliance and that includes the mass storage device as the first component.

2. The system of claim 1 further comprising an application residing on the internet appliance, the internet appliance being capable of providing the application.

3. The system of claim 2 wherein the portion of the mass storage device is accessible only by a user identified on a user list and having a password, the user list including the internet appliance; and wherein the internet appliance further includes the password.

4. The system of claim 3 wherein the internet appliance further comprises an internal memory.

5. The system of claim 4 wherein the internal memory further comprises a FLASH memory.

6. The system of claim 5 wherein the internet appliance is further automatically upgradable via the remote network.

7. The system of claim 1 wherein the internet appliance is further automatically upgradable via the remote network.

8. The system of claim 1 wherein the first component is a workstation.

9. The system of claim 1 wherein the internet appliance is a router.

10. A system for allowing a private network to access a remote network, the private network having a plurality of components, at least one of the plurality of components having a mass storage device, the system comprising:

an internet appliance coupled with the plurality of components; and a portion of the mass storage device of the at least one of the plurality of components, the portion of the mass storage device being sharable and mapped to the internet appliance;

wherein the internet appliance is capable of using any of the plurality of components having the mass storage device and coupled with the internet appliance as the at least one of the plurality of components.

11. The system of claim 1 further comprising an application residing on the internet appliance, the internet appliance being capable of providing the application.

12. The system of claim 11 wherein the application further comprises an electronic mail application.

13. The system of claim 12 wherein the portion of the mass storage device is accessible only by a user identified on a user list and having a password, the user list including the internet appliance; and wherein the internet appliance further includes the password.

14. The system of claim 1 wherein the internet appliance further comprises a router having an internal memory.

15. The system of claim 14 wherein the internal memory further comprises a FLASH memory.

16. The system of claim 1 wherein the internet appliance is further automatically upgradable via the remote network.

17. The system of claim 1 wherein the at least one of the plurality of components further comprises a workstation.

18. The system of claim 1 wherein the at least one of the plurality of components further comprises a file server.

19. The system of claim 16 wherein the high speed online service provider is an internet service provider.

20. A method for providing access to a remote network comprising the steps of:

providing an internet appliance;

providing a component coupled with the internet appliance and having a mass storage device;

allocating a portion of the mass storage device for use by the internet appliance; and making the portion of the mass storage device shareable with and mapped to the internet appliance;

wherein the internet appliance is capable of using any component that is coupled with the internet appliance and that has the mass storage device as the component.

21. The method of claim 20 wherein the step of making the mass storage device shareable with and mapped to the internet appliance further comprises the steps of:

providing a protocol, the protocol for allowing communication between the internet appliance and the portion of the mass storage device;

providing an identity of the component; and providing a name of the portion of the mass storage device.

22. The method of claim 21 wherein the internet appliance further includes a password; and wherein the step of making the mass storage device shareable with and mapped to the internet appliance further comprises the steps of:

providing a user list, the user list including the internet appliance; and providing a password, the portion of the mass storage device being accessible only by a user having a password and included on the user list.

23. The method of claim 20 further comprising the step of:

providing an, the application being stored in the internet appliance, the internet appliance being capable of providing the application.

24. The method of claim 23 wherein the step of providing the internet appliance further comprises the step of;

providing an internal memory.

25. The method of claim 24 wherein the internal mass storage device further comprises a FLASH memory.

26. The method of claim 25 wherein the step of providing the internet appliance further comprises the step of:

providing an upgradable internet appliance capable of being upgraded by accessing the remote network.

27. The method of claim 20 wherein the step of providing the internet appliance further comprises the step of:

providing an upgradable internet appliance capable of being upgraded by accessing the remote network.

28. The method of claim 20 wherein the component is a workstation.

29. The method of claim 20 wherein the internet appliance is a router.

30. A method for providing a private network access to a remote network, the private network including a plurality of components, at least one of the plurality of components including a mass storage device; the method comprising the steps of:

providing an internet appliance coupled with the plurality of components;

allocating a portion of the mass storage device of the at least one of the plurality of components for use by the internet appliance; and making the portion of the mass storage device shareable with and mapped to the internet appliance;

wherein the internet appliance is capable of using any of the plurality of components having the mass storage device and coupled with the internet appliance as the at least one of the plurality of components.

31. The method of claim 30 wherein the step of making the portion of the mass storage device shareable and mapped to the internet appliance further comprises the steps of:

providing a protocol the protocol for allowing communication between the internet appliance and the portion of the mass storage device;

providing an identity of the at least one of the plurality of components; and providing a name of the portion of the mass storage device.

32. The method of claim 31 wherein the internet appliance further includes a password; and wherein the step of making the mass storage device shareable and mapped to the internet appliance further comprises the steps of:

providing a user list, the user list including the internet appliance; and providing a password, the portion of the mass storage device being accessible only by a user having a password and included on the user list.

33. The method of claim 30 further comprising the step of:

providing an, the application being stored in the internet appliance, the internet appliance being capable of providing the application.

34. The method of claim 33 wherein the step of providing an application further comprises the step of providing an electronic mail application.

35. The method of claim 30 wherein the at least one of the plurality of components further comprises a workstation.

36. The method of claim 30 wherein the at least one of the plurality of components further comprises a file server.

37. The method of claim 30 wherein the step of providing the internet appliance further comprises the step of:

providing a router with an internal memory.

38. The method of claim 37 wherein the internal mass storage device further comprises a FLASH memory.

39. The method of claim 30 wherein the step of providing the internet appliance further comprises the step of:

providing an upgradable internet appliance capable of being upgraded by accessing the remote network.

40. The method of claim 39 wherein the remote network is an internet service provider.

* * * * *